United States Patent [19]

Watanabe et al.

[11] Patent Number: 4,832,720

[45] Date of Patent: May 23, 1989

[54] METHOD FOR PRODUCING MULTI-CORE OPTICAL FIBER

[75] Inventors: Minoru Watanabe; Hiroshi Yokota; Shuzo Suzuki; Hiroshi Suganuma, all of Yokohama, Japan

[73] Assignee: Sumitomo Electric Industries, Ltd., Osaka, Japan

[21] Appl. No.: 102,248

[22] Filed: Sep. 28, 1987

Related U.S. Application Data

[63] Continuation of Ser. No. 833,229, Feb. 26, 1986, abandoned.

[30] Foreign Application Priority Data

Mar. 4, 1985 [JP] Japan .................................. 60-41225

[51] Int. Cl.⁴ .......................................... C03B 37/025
[52] U.S. Cl. ........................................ 65/3.11; 65/4.2; 65/4.3; 427/163
[58] Field of Search ................. 65/2, 3, 11, 3.12, 18.2, 65/DIG. 16, 4.2, 4.21, 4.3; 427/163

[56] References Cited

U.S. PATENT DOCUMENTS

| | | | |
|---|---|---|---|
| 3,455,666 | 7/1969 | Bazinet, Jr. ............................... | 65/4 |
| 4,283,213 | 8/1981 | Akers et al. ........................... | 65/3.11 |
| 4,465,708 | 8/1984 | Fanucci et al. ...................... | 427/163 |

FOREIGN PATENT DOCUMENTS

| | | | |
|---|---|---|---|
| 0147225 | 3/1985 | European Pat. Off. | |
| 2240459 | 3/1975 | France. | |
| 2428618 | 2/1980 | France ......................... | 65/DIG. 16 |
| 57-37539 | 5/1981 | Japan .................... | 65/3.12 |
| 59-21537 | 2/1984 | Japan ....................... | 65/2 |
| 59-92929 | 5/1984 | Japan ....................... | 65/2 |
| 60-155543 | 8/1985 | Japan .................... | 65/3.12 |

Primary Examiner—Robert L. Lindsay
Attorney, Agent, or Firm—Cushman, Darby & Cushman

[57] ABSTRACT

A multi-core optical fiber with improved dimensional accuracy is produced by a method comprising
inserting at least two core glass rods in bores formed in a cladding glass rod having a refractive index lower than that of the core glass rods to be inserted,
heating a composite of the cladding glass rod and the core glass rods to integrate them together, and
drawing the integrated composite to fabricate a multi-core optical fiber.
The drawing may be carried out simultaneously with the integration step.

4 Claims, 1 Drawing Sheet

METHOD FOR PRODUCING MULTI-CORE OPTICAL FIBER

This application is a continuation of Ser. No. 06/833229, filed Feb. 26, 1986, now abandoned.

FIELD OF THE INVENTION

The present invention relates to a method for producing a multi-core optical fiber. More particularly, it relates to a method for producing a multi-core optical fiber having improved dimensional accuracy.

BACKGROUND OF THE INVENTION

In a field of telecommunication, a copper cable has been and is being replaced with an optical fiber cable so as to greatly increase an amount of information to be transmitted per unit cross sectional area of the cable. However, it is still desired to further increase the amount of information to be transmitted per unit cross sectional area of the optical fiber cable. To this end, there has been proposed a bunched optical fiber having plural cores therein.

Conventionally, the bunched optical fiber is produced by inserting a bundle of plural glass rods which form cores and claddings in a glass tube, heating and melting a composite of the glass rods and the glass tube to integrate them together and drawing it to fabricate the bunched optical fiber. However, the conventional bunched optical fiber has very poor dimensional accuracy. For example, the positions of the cores are not accurate and/or the cross section of each core is out of round.

SUMMARY OF THE INVENTION

An object of the present invention is to provide a method for producing a multi-core optical fiber having improved dimensional accuracy.

Accordingly, the present invention provides a method for producing a multi-core optical fiber comprising:

inserting at least two core glass rods in bores formed in a cladding glass rod having a refractive index lower than that of the core glass rods to be inserted, heating a composite of the cladding glass rod and the core glass rods to integrate them together, and drawing the integrated composite to fabricate a multi-core optical fiber.

The drawing may be carried out simultaneously with the integration step.

DETAILED DESCRIPTION OF THE INVENTION

In one of preferred embodiments of the invention, the core glass rod has a softening point higher than that of the cladding glass rod. Preferred combinations of glass for the cladding and glass for core are as follows:

1. Core: $SiO_2$-$GeO_2$ Cladding: $SiO_2$-$P_2O_5$
2. Core: $SiO_2$ Cladding: $SiO_2$-F
3. Core: $SiO_2$ Cladding: $SiO_2$-$P_2O_5$-F
4. Core: $SiO_2$ Cladding: $SiO_2$-$B_2O_3$.

Among them, the glass containing $GeO_2$ may absorb light in the ultraviolet range and its radiation and hydrogen properties are greatly degraded. The glass containing $B_2O_3$ absorbs light with longer wavelength. Thus, these kinds of glass are less preferred. In the present invention, it is preferred to use pure quartz glass as the core glass and the glass containing fluorine which lowers the refractive index and the softening point of the glass as the cladding glass. More preferably, the addition of $P_2O_5$ further lowers the softening point of the glass.

The outer diameter of the cladding glass rod may vary with other requirements such as the number of the cores, draw ratio, etc. The outer diameter of the cladding glass and the diameter of the bore can be adequately selected by the skilled person in the art. The diameter of the core glass rod is substantially the same as that of the bore or slightly smaller than the diameter of the bore.

Now, the present invention will be illustrated, by way of example, with reference to the accompanying drawings.

Figure 1A:
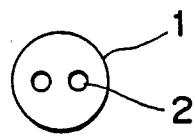
FIG. 1A shows a cross section of a cladding glass rod having two bores extending therethrough in a longitudinal direction.
Figure 1B:
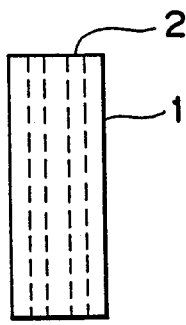
FIG. 1B shows a front view of a cladding glass rod having two bores.
Figure 2:
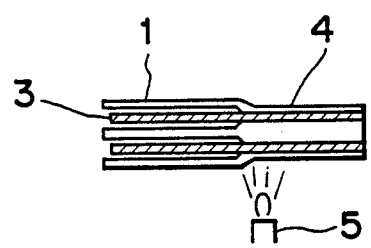
FIG. 2 shows a step for melting the composite of the cladding glass rod and the core glass rods to integrate them together.

FIGS. 1A and 1B shows one example of the cladding glass rod 1 having two bores 2 in which the core glass rods 3 are inserted as shown in the left half of FIG. 2. Then, the composite of the cladding glass rod 1 and the core glass rods 3 is heated by a burner 5 and integrated together to form a glass preform 4 for a multi-core optical fiber as shown in the right half of FIG. 2. The thus formed glass preform is drawn to fabricate a multi-core optical fiber by a conventional method. The composite may be drawn simultaneously with the integration of it to fabricate an optical fiber.

When the softening point of the cladding glass is lower than that of the core glass, the cladding glass rod has a round cross section due to surface tension of the melt glass and the core glass rod keeps its round cross section at a temperature encountered in the drawing step of the glass preform.

The cladding glass rod and the core glass rod may be produced by a conventional method, for example, the vapor phase axial deposition (VAD) method and the modified chemical vapor deposition (MCVD) method.

The bore can be formed in the cladding glass rod by any of the conventional methods. Particularly, ultrasonic processing makes it possible to form a bore through a glass rod having an outer diameter of 3 cm with position accuracy of 0.1 mm or less. Further, the shrinkage of the cladding glass in the integrating step can be minimized since the gap between the inner surface of the cladding glass rod and the outer surface of the core glass rod is very small. Thus, a degree of deformation in this step can be suppressed.

The present invention will be explained further in detail by the following examples.

EXAMPLE 1

By the VAD method, a pure silica soot rod was produced and dehydrated in an electric furnace. Then, it was vitrified in an atmosphere containing $SF_6$ and helium to obtain a fluorine-containing quartz glass rod of 50 mm in diameter. Along its length, two bores each having a diameter of 4 mm were formed by means of an ultrasonic boring machine. In each bore, a quartz rod of 3 mm in diameter was inserted. The quartz rod had been fabricated by dehydrating and vitrifying a glass soot produced by the VAD method and drawing it. A composite of the cladding glass rod having two core quartz glass rods in its bores was heated and integrated. The integrated composite preform was drawn in an electric furnace to obtain a multi-core optical fiber having two cores one of which had a diameter of 7.4 $\mu$m and the other of which had a diameter of 7.3 $\mu$m. A degree of non-roundness of each core was less than 1%. The distance between the two cores was 70 $\mu$m and cross talk was under the limit of measurement.

EXAMPLE 2

By the VAD method, a $SiO_2$-$P_2O_5$ glass soot was produced, dehydrated in an electric furnace containing $SiF_4$ and then vitrified in a helium atmosphere to obtain a phosphor/fluorine-containing quartz rod of 60 mm in diameter. Along its length, four bores each having a diameter of 3 mm were formed by means of an ultrasonic boring machine. In each bore, a pure quartz glass rod of 2 mm in diameter produced by the VAD method was inserted. A composite of the cladding glass rod having four core quartz glass rods in its bores was heated and drawn simultaneouly with integration to fabricate a multi-core optical fiber having four cores each of which had a diameter of 8.1 $\mu$m, 8.0 $\mu$m,, 8.2 $\mu$m and 8.0 $\mu$m. The degree of non-roundness of each core was less than 0.5%. The distance between the adjacent cores was 75 $\mu$m and cross talk was under the limit of measurement.

EXAMPLE 3

By the VAD method, a pure silica soot was produced, dehydrated in an electric furnace containing $CCl_2F_2$ gas and then vitrified in a helium atmosphere to obtain a quartz glass rod of 50 mm in diameter. Along its length, one bore in the center of the rod and six bores around the center bore each having a diameter of 10 mm were formed by means of an ultrasonic boring machine. In each bore, a pure $SiO_2$-$GeO_2$ glass rod of 9 mm in diameter produced by the VAD method was inserted. A composite of the cladding glass rod having seven core glass rods in its bores was heated and drawn simultaneously with integration to fabricate a high NA multi-core optical fiber having seven cores. Specific refractive indexes of the cladding and the cores were $-0.5\%$ and $2.5\%$, respectively, in total $3.0\%$. The degree of non-roundness of each core was less than 1% and fluctuation of the core diameter and distances between the cores was less than 2%.

EXAMPLE 4

By the VAD method, a $SiO_2$ glass soot was produced, dehydrated in an electric furnace containing $SiF_4$ and then vitrified in a helium atmosphere to obtain a fluorine-containing quartz glass rod of about 60 mm in diameter. The rod was deformed at a high temperature and pressure to produce a prism having a square cross section of 24 mm by 120 mm. Along its length, five bores each having a diameter of 11 mm were formed in parallel by means of an ultrasonic boring machine. In each bore, a quartz rod of 10 mm in diameter containing a slight amount of $GeO_2$ was inserted. A composite of the cladding glass bar having five core quartz glass rods in its bores was heated and drawn simultaneously with intagration to fabricate a five-core optical fiber having a square cross section of 70 $\mu$m by 350 $\mu$m, each core of which had a diameter of 30 $\mu$m.

What is claimed is:

1. A method for producing a multi-core optical fiber comprising:
    inserting at least two core glass rods in bores formed in a cladding glass rod having a lower refractive index and a lower softening point than that of the core glass rods to be inserted,
    heating a composite of said cladding glass rod and said core glass rods to integrate them together, and
    drawing the integrated composite to fabricate a multi-core optical fiber.

2. The method according to claim 1, wherein said cladding glass rod is made of quartz glass containing fluorine and said core glass rod is made of pure quartz glass.

3. A method for producing a multi-core optical fiber comprising the steps of:
    inserting at least two core glass rods consisting essentially of $SiO_2$ in bores formed in a cladding glass rod having a lower refractive index and a lower softening point than that of the core glass rods to be inserted,
    heating a composite of said cladding glass rod and said core glass rods to integrate them together, and
    drawing the integrated composite to fabricate a multi-core optical fiber.

4. A method for producing a multi-core optical fiber comprising the steps of:
    inserting at least two core glass rods consisting essentially of $SiO_2$-$GeO_2$ in bores formed in a cladding glass rod having a lower refractive index and a lower softening point than that of the core glass rods to be inserted,
    heating a composite of said cladding glass rod and said core glass rods to integrate them together, and
    drawing the integrated composite to fabricate a multi-core optical fiber.

* * * * *